US009858291B1

(12) United States Patent
Thakur et al.

(10) Patent No.: US 9,858,291 B1
(45) Date of Patent: Jan. 2, 2018

(54) DETECTION OF RELATED LOCAL ENTITIES (71) Applicant: Google Inc., Mountain View, CA (US)

(72) Inventors: Kumar Mayur Thakur, West Orange, NJ (US); Mukund Jha, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 675 days.

(21) Appl. No.: 14/528,684

(22) Filed: Oct. 30, 2014

Related U.S. Application Data

(60) Provisional application No. 61/897,619, filed on Oct. 30, 2013.

(51) Int. Cl.
G06F 17/30 (2006.01)

(52) U.S. Cl.
CPC .. *G06F 17/30241* (2013.01); *G06F 17/30864* (2013.01); *G06F 17/3053* (2013.01)

(58) Field of Classification Search
None
See application file for complete search history.

(56) References Cited

U.S. PATENT DOCUMENTS

| 7,870,127 | B2 | 1/2011 | Gupta |
| 8,024,314 | B2 | 9/2011 | Wang |
| 8,150,844 | B2 | 4/2012 | Redstone |
| 8,332,396 | B1 | 12/2012 | Srinivasaiah |
| 8,346,770 | B2 | 1/2013 | Smith |
| 8,396,888 | B2 | 3/2013 | Cheng |
| 8,484,199 | B1 | 7/2013 | Katragadda |
| 2003/0163462 | A1* | 8/2003 | Kawamura ....... G06F 17/30675 |
| 2010/0036807 | A1 | 2/2010 | Lieske |
| 2010/0076968 | A1 | 3/2010 | Boyns |
| 2010/0082617 | A1 | 4/2010 | Liu |
| 2011/0119255 | A1* | 5/2011 | Shen ............. G06Q 30/02 707/722 |
| 2011/0119265 | A1 | 5/2011 | Shahabi |
| 2011/0184945 | A1 | 7/2011 | Das |
| 2013/0097162 | A1 | 4/2013 | Corcoran |
| 2013/0110830 | A1 | 5/2013 | Vadlamani |
| 2013/0166585 | A1 | 6/2013 | Das |

FOREIGN PATENT DOCUMENTS

WO    WO2010075273 A1    7/2010

* cited by examiner

*Primary Examiner* — Jau-Shya Meng
(74) *Attorney, Agent, or Firm* — Fish & Richardson P.C.

(57) ABSTRACT

Methods, systems, and apparatus, including computer programs encoded on a computer storage medium, for processing local entities. In one aspect a method includes accessing data specifying query terms for each local entity in a set of local entities, and for each query term a term value based on a number of instances of queries that include the query term occurring in a query log, and a selection value based on a number of selections of search results that each reference the local entity in response to a query that includes the query term and attributed to the query term; selecting a first local entity from the set of local entities; selecting a subset of second local entities from the set of local entities; and for each second local entity in the subset, determining a measure of similarity of the second local entity to the first local entity.

20 Claims, 3 Drawing Sheets

DETECTION OF RELATED LOCAL ENTITIES

CROSS-REFERENCE TO RELATED APPLICATIONS

This application claims the benefit of U.S. Application Ser. No. 61/897,619, filed on Oct. 30, 2013, the entire disclosure of which is incorporated herein by reference.

BACKGROUND

This specification relates to processing local entity content.

The Internet provides access to a wide variety of resources such as video or audio files, web pages for particular subjects, book articles, or news articles. A search system can identify resources in response to a search query that includes one or more search phrases (i.e., one or more words). The search system ranks the resources based on their relevance to the search query and on measures of quality of the resources and provides search results that link to the identified resources. The search results are typically ordered for viewing according to the rank.

Some search systems can obtain or infer a location of a user device from which a search query was received and include local search results that are responsive to the search query. A local search result is a search result that references a document that describes a local entity. A local entity, in turn, is an entity that has been classified as having local significance to particular location. Local entities are typically physical entities associated with an address or a region, such as a restaurant, a hospital, a landmark, and the like. A search result referencing a document describing a local entity receives a search score "boost" for a query if the location associated with the local entity is near the location of the user device. For example, in response to a search query for "coffee shop," the search system may provide local search results that reference web pages for coffee shops near the location of the user device. Many users in various geographic regions will likely be satisfied with receiving local results for coffee shops in response to the search query "coffee shop" because it is likely that a user submitting the query "coffee shop" is interested in search results for coffee shops that are local to the user's location.

Some search systems also provide search results based on similarity of the subject matter that the documents describe. In the context of local entities, for example, search engines may provide search results for local entities that are related to each other in some predetermined way. For example, in the context of restaurants, suggestions for other restaurants that offer similar menu items at similar prices may be made in response to a selection of search result that references a first restaurant, or in response to a search of other restaurants related to a first restaurant.

SUMMARY

In general, one innovative aspect of the subject matter described in this specification can be embodied in methods that include the actions of accessing data specifying, for each local entity in a set of local entities, wherein each local entity is a physical entity resolved to a geographic location and having local significance to the geographic location: for each of a plurality of query terms, a term value that is proportional to a number of instances of queries that include the query term occurring in a query log, for each of the plurality of query terms, a selection value that is a proportional to a number of selections of search results that each respectively reference the local entity in response to a query that includes the query term and attributed to the query term; selecting a first local entity from the set of local entities; selecting a first proper subset of second local entities from the set of local entities, the proper subset not including the first local entity; and for each second local entity in the proper subset of local entities, determining a similarity measure that is a measure of similarity of the second local entity to the first local entity, the similarity measure being determined based, in part, on the term values and the selection values of the query terms specified for the second local entity and the first local entity; and ranking the second local entities in the proper subset of local entities against each other in an order that is indicative of the respective similarities measures of the second local entities in the proper subset. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. A system implementing the subject matter described below allows for a comparison of many local entities in a computationally feasible way. By limiting the proper subset of candidate local entities to compare to a first local entity, an entire corpus of local entities can be evaluated for related local entities. The proper subset can be based on distance from the first local entity, which models users' interests being limited to a local area for local entities. Furthermore, because the system takes into account the magnitudes of both the selection value and the term value for each particular query term, bias resulting from infrequent query terms is reduced. Additionally, the system also determines the distribution of a query term selection among local entities, and query terms with selections that are proportionally more concentrated on a particular local entity are determined to be more relevant for that particular local entity. Thus, provided the magnitudes of both the selection value and the term values of a query term are sufficient, a high proportional distribution of the query term for two particular local entities is indicative of a high similarity of the local entities relative to that query term. This reduces the effect of "noisy" query terms that may have selection values and term values for many local entities that are, in fact, dissimilar.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A system determines, for each local entity in a set of local entities, a corresponding set of related local entities. The local entities in each corresponding set are ranked according to respective similarity measures that each measure a similarity of a local entity in the corresponding set to a selected local entity.

The similarity measure is based, in part, on query term data for each local entity. A query term, as used in this written description, can be an n-gram that is a constitute part of a query, but need not be an entire query. For example, for the query "Restaurant Review Gino's", the query terms may be the unigrams "Restaurant," "Review," and "Gino's." Other n-grams, such as bi-grams, tri-grams, etc., can also be used as query terms.

The query term data specifies, for each of multiple query terms, a term value that is proportional to a number of instances of queries that include the query term occurring in a query log. The query data also specifies, for each query term, a selection value that is a proportional to a number of selections, e.g., clicks, of search results that each respectively reference the local entity and provided in response to a query that includes the query term.

The system selects a first local entity from the set of local entities, and then selects a proper subset of second local entities from the set of local entities. The proper subset may be, for example, all local entities within a distance of K miles of the first local entity. Then, for each second local entity in the proper subset of local entities, the system determines a similarity measure that is a measure of similarity of the second local entity to the first local entity. The similarity measure is determined based, in part, on the term values and the selection values of the query terms specified for the second local entity and the first local entity. The second local entities in the proper subset are ranked against each other in an order that is indicative of the respective similarities measures of the second local entities in the proper subset. The process is repeated for each other local entity, so that at the end of the process each local entity has a listing of similar locals entities within a radius of K miles (or some other area metric).

These features and additional features are described in more detail below. To illustrate certain advantages and features of the subject matter described below, the subject matter is described in the context of a search system application. However, the subject matter can be used for many other purposes, each of which that requires an analysis of entities based on similarity signals and distances.

Example Environment

Figure 1:
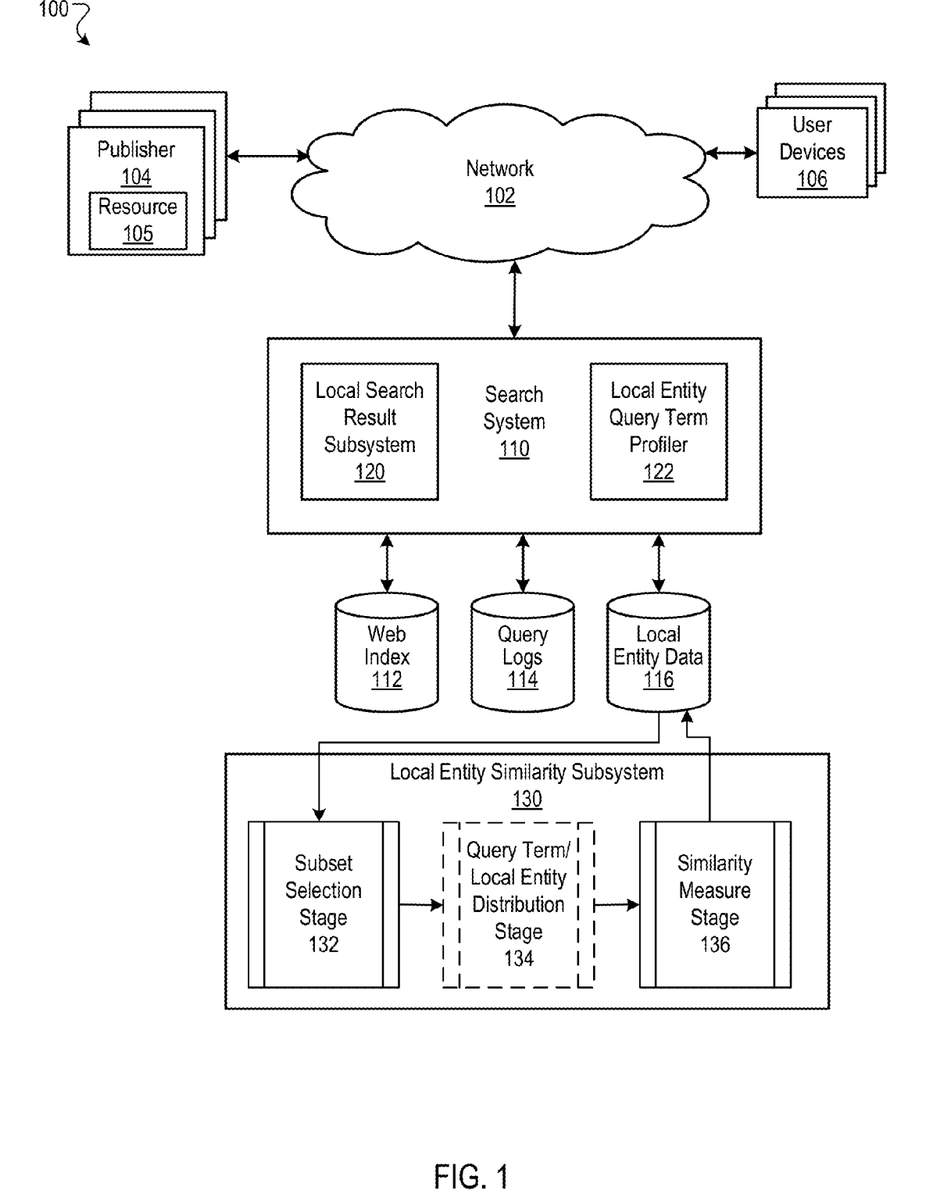
FIG. 1 is a block diagram of an example environment in which a system detects related local entities.

FIG. 1 is a block diagram of an example environment in which a system 100 detects related local entities. The example environment 100 includes a network 102, such as the Internet, and connects publisher web sties 104, user devices 106, and the search system 110. Each website 104 is a collection of one or more resources 105 associated with a domain name and hosted by one or more servers. An example website is a collection of web pages formatted in hypertext markup language (HTML) that can contain text, images, multimedia content, and programming elements, e.g., scripts. Each website 104 is maintained by a publisher, e.g., an entity that manages and/or owns the website.

A resource 105 is any data that can be provided by the website 104 over the network 102 and that is associated with a resource address. Resources 105 include HTML pages, word processing documents, and portable document format (PDF) documents, images, video, and feed sources, to name just a few. The resources can include content, e.g., words, phrases, images and sounds and may include embedded information (e.g., meta information and hyperlinks) and/or embedded instructions (e.g., scripts). Each resource can include content, such as text and video.

The search system 110 may implement processes that can determine particular entities, such as persons, places and things that are the subject of each document. Thus, as used in this written description, the term "entity" is distinct from a document resource. The search system 110 can generate a mapping of entities to documents, where the mapping specifies, for each entity, the document that describes the entity, and, optionally, a score that describes how important the entity is to the subject matter of the document. For example, a first document that list hundreds of restaurants having ratings within a particular range may have a relatively low score for each restaurant entity, as the information the document contains for each entity is relatively little. Conversely, a second document whose primary subject is a particular restaurant, and which describes the restaurant menu, the Chef, etc., may have a much higher score for the particular city entity than the first document.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105. Data describing the resources 105 can be indexed and stored in a web index 112.

The user devices 106 submit search queries to the search system 110. In response, the search system 110 accesses the index 112 to identify resources 105 that are determined to be relevant to the search query. The search system 110 identifies the resources in the form of search results and returns the search results to the user devices 106 in search results page resource. A search result is data generated by the search system 110 that identifies a resource (generally referred to as a "document") or provides information that satisfies a particular search query. A search result for a document can include a web page title, a snippet of text extracted from the web page, and a resource locator for the resource, e.g., the URL of a web page. As used in this document, a "search result" is each individual listing provided in a search results web page, and a "search result document," or simply "document" is the resource linked to by the search result.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries submitted from user devices 106 are stored in query logs 114. Other information can also be stored in the query logs, such as selection data for the queries and the web pages referenced by the search results and selected by users. The query logs 114 can thus be used to map queries submitted by user devices to resources that were identified in search results and the actions taken by users when presented with the search results in response to the queries.

Although many users may be satisfied with the search results that are generated and presented as described above, the search system 110 can use additional information and utilize additional subsystems to improve the quality of search results for particular users. One example of utilizing additional information is local search result processing. A local result subsystem 120 can identify local documents for a search query. A local document is a document that references a local entity that is specified as having local significance to a geographic location. A variety of appropriate systems may be used to determine local documents and the local entities they reference. For example, the local result subsystem 120 may determine a document is a local document if the document includes an address; or if search results for the document have a high rate of selection from user devices in a given location relative to user devices outside of the particular location; or if the local document has been specified by the publisher as being local to a particular location; etc. For queries that have a local intent, the local result subsystem 120 may indicate that certain documents that are determined to be responsive to the query are eligible for promotion. Data describing the local documents, and the local entities that are determined from the local documents, may be stored in the local entity data 116, and the feature of a document referencing a particular local entity may be stored be stored in the web index 112.

Local Entity Similarity

When processing local results, the similarity of local entities to other local entities may be used when determining search scores of documents that reference the local entities. Likewise, if the search system 110 is used to search local entities independent of documents (e.g., such as a search for restaurants), the similarity of local entities to other local entities can also be used when determining which local entities to list in response to a local entity query. Accordingly, the search system 110 can include, or be in data communication with, a local entity similarity subsystem 130. The local entity similarity subsystem 130 determines, for each local entity, a corresponding list of similar local entities that includes a list of local entities ranked according to their similarity to the local entity to which the list corresponds.

In an example implementation, the local entity similarity subsystem 130 includes a subset selection stage 132, an optional query term/local entity distribution stage 134, and a similarity measure stage 136. The subset selection stage 132 selects a subset of local entities for similarity comparison to a selected local entity. The subset may be selected based on a geographic distance from the selected local entity, or based on a category of the selected local entity, or by some other appropriate selection process. The query term/local entity distribution stage 134 evaluates query term types and selection distribution of query terms among local entities. From these evaluations, the query term/local entity distribution stage 134 may generate weights or other adjustments specific to the query terms and that affect the resulting similarity measure calculations. This stage is an optional stage. Finally, the similarity measure stage determines the similarity of each local entity in the subset of local entities to the selected local entity.

Figure 2:
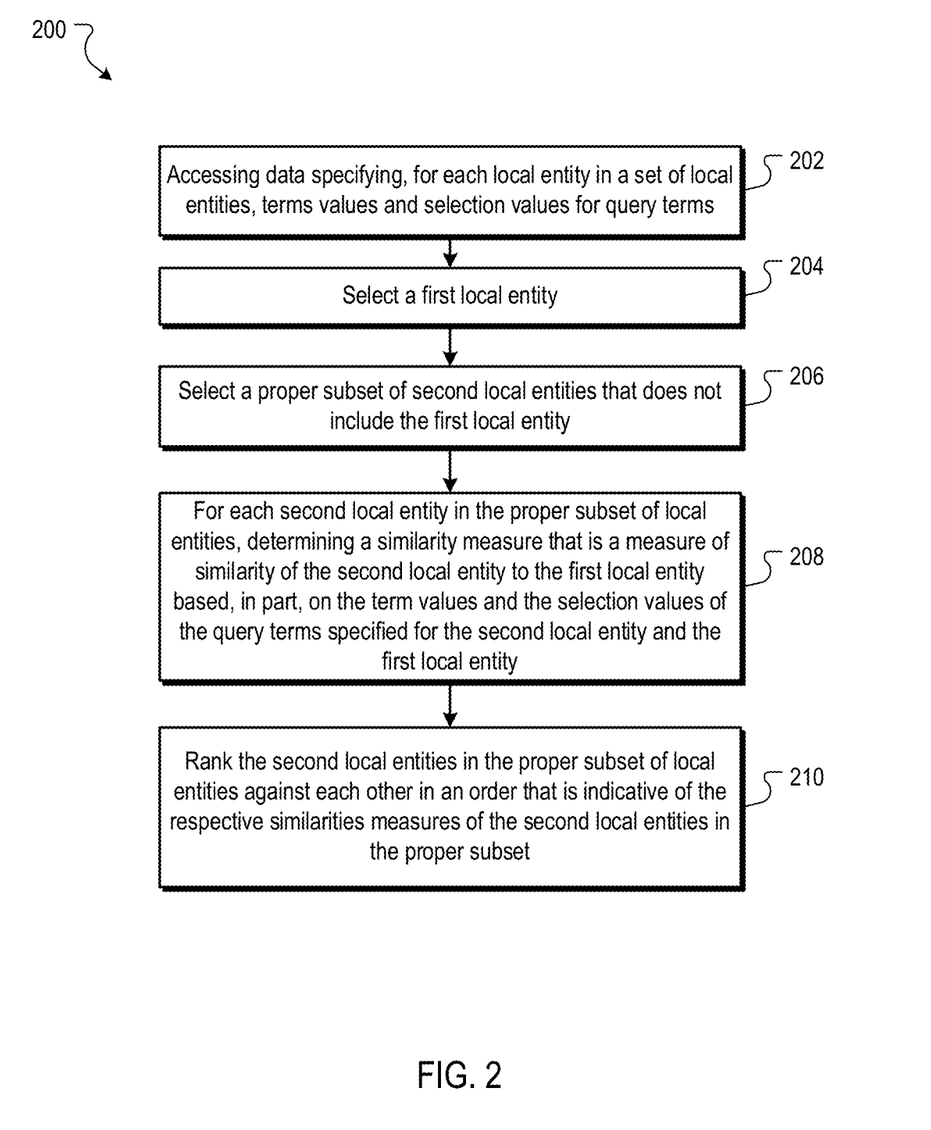
FIG. 2 is a flow diagram of an example process detecting related local entities.

Operation of the local similarity subsystem 130 is described with reference to FIG. 2, which is flow diagram of an example process 200 for detecting related local entities. The local entity similarity subsystem 130 and the process 200 can be implemented in a data processing apparatus that includes one or more computer processing devices.

The process 200 accesses data specifying, for each local entity in a set of local entities, term values and selection values for query terms (202). The term value is proportional to a number of instances of queries that include the query term occurring in a query log. For example, suppose the queries "Restaurants NYC Italian" and "Italian Restaurants Manhattan" each respectively appear N times in a query log. Based on these two queries and their respective instances, the term value for "Restaurants" is proportional to 2N, while the term values for 'NYC," "Italian" and "Manhattan" are proportional to N.

The selection value is proportional to a number of selections of search results that each respectively specifies a local entity in response to a query that includes the query term and attributed to the query term. For example, assume that search results, each referencing a document, are provided in response to a search query. For each selection of a search result referencing a document that, in turn, references a local entity, the selection value for the query terms of the query are increased for that local entity. How much the selection value is increased may depend, in some implementations, on the score that describes how important the entity is to the subject matter of the document. For example, for the first document that list hundreds of restaurants, described above, and having relatively low score for each restaurant entity, a query term selection value for a particular query term and local entity would be increased very little in response to a selection of a search result referencing the document. Conversely, for the second document that is highly scored for the local entity, a query term selection value for the particular query term and local entity would be increased much more than for the selection of the first local document.

The data specifying the term values and the selection values for the query terms and local entities can be provided by a system external to the local entity similarity subsystem 130. For example, a local entity query term profiler 122 may process query logs 114 and local entity data 116 to determine the term values and selection values.

Thus, for each local entity, the data described above may be of the form:

$$X_j:<[TV_1,SV_1],[TV_2,SV_2] \ldots [TV_n,SV_n]>$$

where $X_j$ is the $j^{th}$ local entity, and the $TV_q$ and $SV_q$ values are the term values and selection values for the $q^{th}$ query term in the query logs 114.

The process 200 selects a first local entity (204), and then selects a proper subset of second local entities that does not include the first local entity (206). The proper subset can be selected by a subset selection stage 132. The proper subset of second local entities are local entities that are to be compared to the first local entity to determine the similarity of each second local entity to the first local entity. Selecting a proper subset of second local entities from the set of local entities can, for example, involve selecting local entities that have a geographic location within a threshold distance of the geographic location of the first local entity. The threshold distance can be a fixed distance, or can vary based on the local entity type. For example, for a first entity of a restaurant type, the distance may be 10 miles; for a first entity of a gas station type, the distance may be three miles; etc.

The distance can also be based on an estimate time of travel. For example, when a first local entity is selected, all other local entities within an estimate 20 minute drive may be selected. Thus, depending on geographic boundaries (e.g., bridges, rivers, etc.), the area from which other local entities are selected may be asymmetric, and not simply circular or rectangular. Time-based distance can be determined from, for example, traffic patterns obtained from systems external to the subset selection stage 132 and path finding algorithms.

The process 200 determines, for each second local entity in the proper subset of local entities, a similarity measure that is a measure of similarity of the second local entity to the first local entity based, in part, on the term values and the selection values of the query terms specified for the second local entity and the first local entity (208). A variety of appropriate processes can be used to determine the similarity measures. For example, a similarity measure stage 136 can determine, for each query term QT, a term frequency score that is proportional to the magnitude of the term value of the query term for the first local entity and the term value of the query term for the second local entity, and a selection frequency score that is proportional to the magnitude of the selection value of the query term for the first local entity and the selection value of the query term for the second local entity. The similarity measure is then based, in part, on the term frequency scores and the selection frequency scores of the query terms specified for the second local entity and the first local entity. This particular example process can be expressed as:

$$SIM(X_j, Y_k) = f([TFS_1, SFS_1], [TFS_2, SFS_2] \ldots [TFS_n, SFS_n])$$

where:

$X_j$ is the $j_{th}$ local entity being processed to determine local entities that are similar to it;

$Y_k$ is the $k^{th}$ local entity in the proper subset selected for the local entity $X_j$;

$TFS_q$ is the term frequency score for the $q^{th}$ query term and is based on the term values $TV_{qk}$ and $TV_{qk}$ for the respective CO query term of the local entities $X_j$ and $Y_k$; and $SFS_q$ is the selection frequency score for the $q^{th}$ query term and is based on the selection values $SV_{qj}$ and $SV_{qk}$ for the respective $q^{th}$ query term of the local entities $X_j$ and $Y_k$.

Other processes that take into account the constituent relative magnitudes of the term values and selection values of the query terms can also be used. For example, the similarity measure stage 136 may determine, for each query term, a constituent scoring component that is proportional to magnitudes of the term values of the query term for the first and second local entities and the magnitudes of the selection values of the query term for the first and second local entities.

This particular example process can be expressed as:

$$SIM(X_j, Y_k) = f(CSC_1, CSC_2 \ldots CSC_n)$$

where:

$CSC_q$ is the $q^{th}$ constituent scoring component based on the term values $TV_{qk}$ and $TV_{qk}$ and the selection values $SV_{qj}$ and $SV_{qk}$ for the respective $q^{th}$ query term for the local entities $X_j$ and $Y_k$.

Each constitute scoring component may be based on a formula of the form:

$$CSC_q = f(TV_{qj}, SV_{qj}, TV_{qk}, SV_{qk})$$

Other appropriate scoring techniques that take into account the magnitudes of the term values and selection values can also be used. For example, each term value and selection value of a query term for a local entity can be combined to form a single value. The resulting query term vectors of two local entities can then be compared using, for example, a cosine similarity-based function.

The process 200 ranks the second local entities in the proper subset of local entities against each other in an order that is indicative of the respective similarities measures of the second local entities in the proper subset (210). The ranked list can then be stored in the local entity data 116. The process 200 can be repeated for each local entity such that each local entity has an associated list of similar local entities that occur within a distance metric (e.g., maximum distance, maximum travel time) of the first local entity.

Selection Value Distributions

The distribution of selection values for a query term can be used as a similarity signal. To illustrate, some query terms may occur often but may not be significantly descriptive or otherwise indicative of a particular local entity. Furthermore, these query terms may occur in many queries for many different local entities. Conversely, some query terms may also occur frequently, but may be proportionally distributed in queries that also result in many selections of a local entity. Thus, a particular term being primarily distributed to both a first entity and a second entity is a much stronger signal of similarity than when a particular term is not primarily distributed to both entities.

For example, the term "reviews" may occur in many queries, and thus it has a high term frequency from the query logs. The term may also have many selections for each entity, and thus it may have a high selection count for many entities.

Likewise, the query term "pizza" will also have a high term frequency in the query logs. However, this query term will tend to have higher selection counts for pizza restaurants, and have much lower selection counts for French restaurants, Indian restaurants, Chinese restaurants, etc. Thus, the term "pizza" has a higher selection distribution for restaurant entities that serve pizza than for other entities that do not.

The distribution of the query selections can, in some implementations, be measured in click fractions by a query term/local entity distribution process stage 134. When entities have similar click fraction distributions for a term, and those click fractions are also concentrated on those entities and not diffused across many entities, the system will interpret such a signal as being indicative of a high degree of similarity with respect to that query term.

Figure 3:
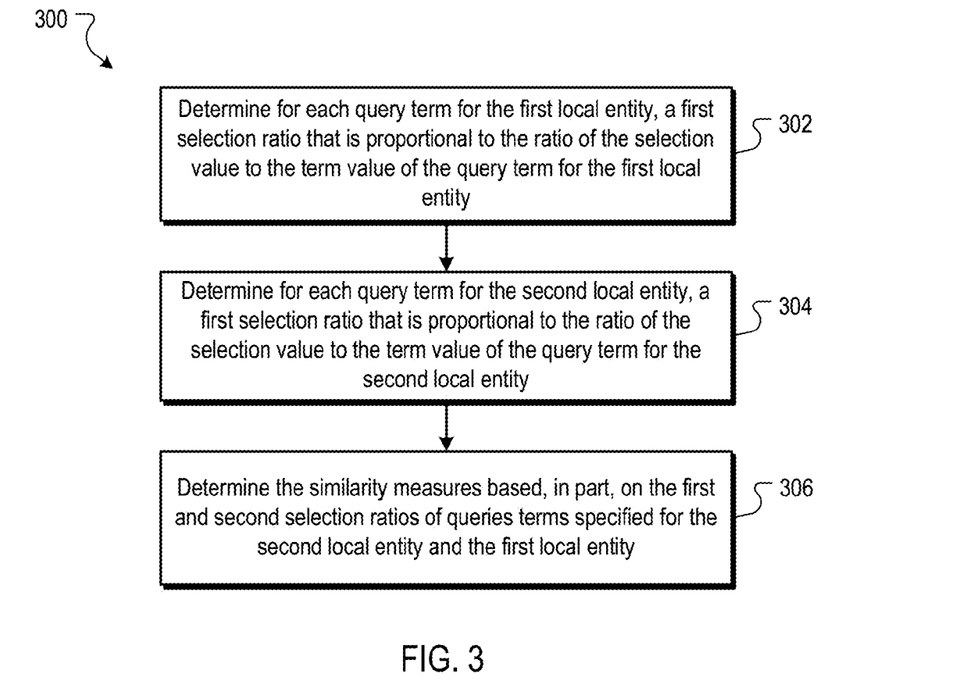
FIG. 3 is a flow diagram of an example process for determining a similarity measure that is based, in part, on a distribution of a query term.

One example process to that can be used to make such a determination is shown in FIG. 3, which is a flow diagram of an example process 300 for determining a similarity measure that is based, in part, on a distribution of a query term. The process 300 can also be implemented in a data processing apparatus that includes one or more computer processing devices.

The process 300 determines, for each query term for the first local entity, a first selection ratio that is proportional to the ratio of the selection value to the term value of the query term for the first local entity (302). For example, for each query term of the first local entity, the ratio of the SV to TV, e.g., SV/TV, can be determined.

The process 300 determines for each query term for the second local entity, a first selection ratio that is proportional to the ratio of the selection value to the term value of the query term for the second local entity (304). For example, for each query term of the second local entity, the ratio of the SV to TV, e.g., SV/TV, can be determined.

The process 300 determine the similarity measures based, in part, on the first and second selection ratios of queries terms specified for the second local entity and the first local entity (306). For example, the process 300 can determine the relative distribution of the selection ratios for the query term across other local entities in the proper subset. If the selection ratios of the first and second local entities indicate the selection distributions are not significant for the first and second local entities, then the similarity of the first and second local entities relative to the query term may be small as compared to other query terms. Conversely, if the selection ratios of the first and second local entities indicate the selection distributions are significant for the first and second local entities, then the similarity of the first and second local entities relative to the query term may be relatively large as compared to other query terms.

For example, for each $k^{th}$ query term, the query term/local entity distribution process stage 134 can determine a central tendency of selection ratios for the query term across z local entities. The central tendency may be a median value, or some other central tendency. A selection ratio for a particular local entity is compared to the median selection ratio for the query term, and the query term/local entity distribution process stage 134 determines a weight that measures the significance of the term to the local entity based on the magnitude of the median selection ratio and the selection ratio for the query term. The weight may be given by the formula:

$$W\_QT_k = f((SV_k/TV_k), \text{Median}(SV_i/TV_i; i=1 \ldots z)),$$

where:
i is an index for each local entity in the proper subset, with z being the cardinality of the proper subset; and
k is the $k^{th}$ query term, where k=1 . . . n, n being the number of query terms for which term values and selection values are evaluated.

The function results in a weight that indicates an increasing degree of significance as the magnitude of selection ratio for the local entity increases from the median selection ratio. A variety of function curves can be used, such as a sigmoid, or an asymptotic function that approaches a maximum value.

The weights can, for example, be used as an input parameter for the similarity scoring processes described above, e.g., $$CSC_q = f(TV_{qj}, SV1_{qj}, TV_{qk}, SV_{qk}, W\_QT_q)$$

While the example above describes the use of selection ratios, other relationships between the selection values and the term values for each query term can also be used.

Term Quality

In some implementations, local entity similarity subsystem 130 may determine a term quality score for each term, and the quality score for each term may be used in one or more of the equations above to determine the similarity of two entities. The quality score may be a binary score, e.g., 1 for "High Quality" and 0 for "Low Quality," or may be a rational number, or some other parameter value that can be used to indicate a quality of a term relative to other terms.

In some implementations, terms that are indicative of categories are considered to be high quality terms, and terms that are not indicative of categories are determined to be low quality terms. Furthermore, in some implementations, the terms that are indicative of categories may only be considered high quality terms if the terms are relatively independent of location biases and navigational biases.

Figure 4:
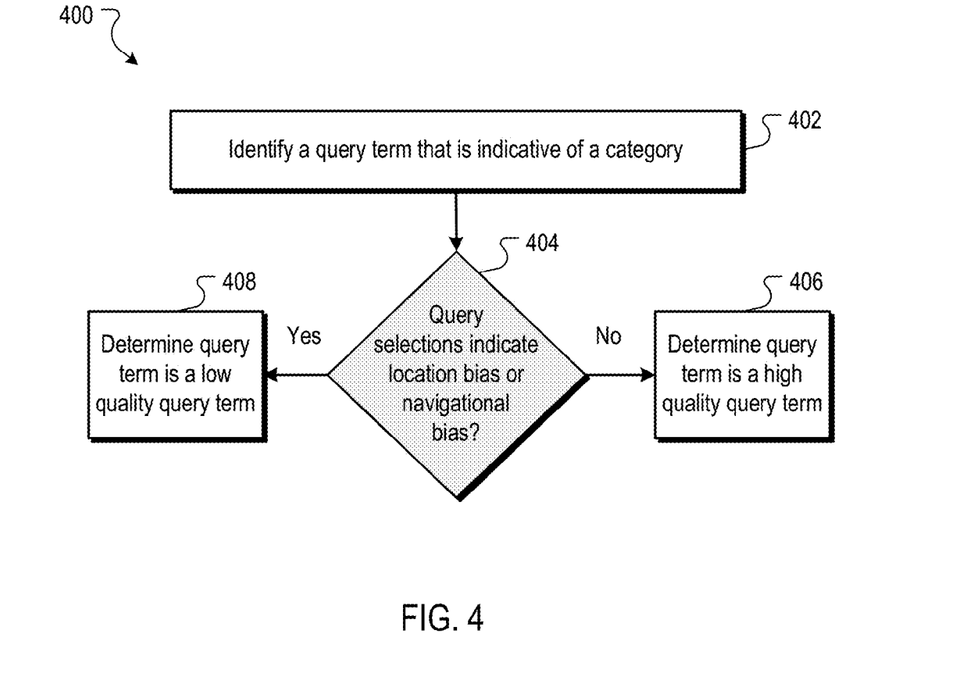
FIG. 4 is a flow diagram of an example process for determining query term quality.

FIG. 4 is a flow diagram of an example process 400 for determining query term quality based on category indicators and biases. The process 400 may be implemented in a data processing apparatus that includes one or more data processors.

The process 400 identifies a query term that is indicative of a category (402). One example way of determining whether a query term is indicative of a category is to determine whether a threshold portion of clicks for the query term are for search result documents that belong to a particular category. For example, each search result document may be categorized as belonging to one or more categories. If a threshold percentage of selections for queries that include the query term are for search result documents belong to a particular category, then the query term is indicative of the category. Otherwise, the query term is not indicative of the category. To illustrate, assume the subsystem 130 selects the query term "Pizza," and then determines that at least a threshold percentage of documents selected in response to queries that include the term "Pizza" belong to the category of "food." The query term is thus indicative of the category "food."

The process 400 determines whether the query selections indicate a location bias or a navigational bias (404). As used herein, a location bias is when locations of search result documents selected for a term are predominately clustered in certain geographic areas. For example, the term "NYC" may have a location bias for the geographic area surrounding New York City, as many search queries may include this term to limit results to locations in this area. Examples of such queries are "Pizza NYC," "Indian Restaurants NYC," etc. Conversely, the terms "Pizza," "Indian," and "Restaurants" each have corresponding selections of search result documents associated with many different locations across a much larger region, such as a particular country or continent. These latter terms are not subject to location biases.

A navigational bias, on the other hand, is when entities referenced by search result documents are likewise clustered, and the entities are different. For example, assume there is a restaurant chain named "Lombardi's," and there is also a dry cleaning store named "Lombardi's." Selections of the documents for queries that include the query term "Lombardi's" may indicate a navigational signal (e.g., a relatively high percentage of selections of particular documents that reference an entity for the query term) for both the restaurant chain and the dry cleaning store. Because these entities are different, query term has a navigational bias.

In some implementations, all navigational query terms may be determined to be low quality queries for similarity measure determinations, regardless of whether the query term is navigational for two different entities. For example, the query term "Google" is a navigational query for the website at www.google.com, however, for the purposes of entity similarity as determined by the subsystem 130, the query term "Google" may be determined to be a low quality query term.

If the query selections do not indicate a location bias or a navigational bias, then the query term is determined to be a high quality query (406); otherwise, it is determined to be a low quality query (408).

Term quality may be reflected in the query term vector. Accordingly, for each local entity, the data described above may be of the form:

$$X_j:<[TV_1,SV_1,TQ_1],[TV_2,SV_2,TQ_2] \ldots [TV_n,SV_n,TQ_n]>$$

where $X_j$ is the $j^{th}$ local entity, and the $TV_q$, $SV_q$, and $TQ_q$ values are the term values, selection values and the term quality values for the $q^{th}$ query term in the query logs 114.

In some implementations, only high quality terms are considered for determining the similarity measure between two entities. In other implementations, both high quality and low quality terms are considered. In this latter implementation, the similarity measure is further on the similarity of selection values for the high quality terms and low quality terms. In particular, the similarity measure calculation can be designed such that a large similarity of relatively high selection values for high quality terms results in a stronger similarity measure. Likewise, a large similarity of relatively low selection values for low quality term also results in a stronger similarity measure.

A "similarity" of relative selection values means that the distribution of selections for a query term are similar. For example, assume a first entity is a restaurant and a second is a casino. Both entities may have 5,000 clicks from queries with the term "restaurant," but the restaurant entity has 7,000 total clicks from all queries attributed to it, while the casino has 1,000,000 total clicks from all queries attributed to it. Because the relative distributions are very different, there is very little similarity attributed to the "restaurant" term for these two entities. Conversely, another entity with 4,000 clicks from queries with the term "restaurant," 6,000 total clicks would be considered to be similar to the restaurant entity for the term "restaurant." Likewise, yet another entity with 6,000 clicks from queries with the term "restaurant," and 975,000 total clicks would be considered to be similar to the casino entity for the term "restaurant."

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    accessing, by one or more computers, data specifying, for each local entity in a set of local entities, wherein each local entity is a physical entity resolved to a geographic location and having local significance to the geographic location:
        for each of a plurality of query terms, a term value that is proportional to a number of instances of queries that include the query term occurring in a query log;
        for each of the plurality of query terms, a selection value that is a proportional to a number of selections of search results that each respectively reference the local entity in response to a query that includes the query term and attributed to the query term;
    selecting a first local entity from the set of local entities;
    selecting a first proper subset of second local entities from the set of local entities, the proper subset not including the first local entity; and
    for each second local entity in the proper subset of local entities, determining a similarity measure that is a measure of similarity of the second local entity to the first local entity, the similarity measure being determined based, in part, on the term values and the selection values of the query terms specified for the second local entity and the first local entity; and
    ranking the second local entities in the proper subset of local entities against each other in an order that is indicative of the respective similarities measures of the second local entities in the proper subset.

2. The method of claim 1, wherein selecting a proper subset of second local entities from the set of local entities comprises selecting only local entities that have a geographic location within a threshold distance of the geographic location of the first local entity to include in the proper subset.

3. The method of claim 1, wherein determining, for each second local entity in the proper subset of local entities, the similarity measure that is a measure of similarity of the second local entity to the first local entity comprises:
    determining, for each query term:
        a term frequency score that is proportional to the magnitude of the term value of the query term for the first local entity and the term value of the query term for the second local entity; and
        a selection frequency score that is proportional to the magnitude of the selection value of the query term for the first local entity and the selection value of the query term for the second local entity;
determining the similarity measures based, in part, on the term frequency scores and the selection frequency scores of the queries terms specified for the second local entity and the first local entity.

4. The method of claim 1, wherein determining, for each second local entity in the proper subset of local entities, the similarity measure that is a measure of similarity of the second local entity to the first local entity comprises:
for each query term, determining a constituent scoring component that is proportional to magnitudes of the term values of the query term for the first and second local entities and the magnitudes of the selection values of the query term for the first and second local entities; and
determining the similarity measures based, in part, on the constituent scoring components of the queries terms specified for the second local entity and the first local entity.

5. The method of claim 1, wherein determining, for each second local entity in the proper subset of local entities, the similarity measure that is a measure of similarity of the second local entity to the first local entity comprises:
determining, for each query term for the first local entity, a first selection ratio that is proportional to the ratio of the selection value to the term value of the query term for the first local entity;
determining, for each query term for the second local entity, a second selection ratio that is proportional to the ratio of the selection value to the term value of the query term for the second local entity; and
determining the similarity measures based, in part, on the first and second selection ratios of queries terms specified for the second local entity and the first local entity.

6. The method of claim 5, wherein determining, for each second local entity in the proper subset of local entities, the similarity measure that is a measure of similarity of the second local entity to the first local entity further comprises:
for each query term, determining a constituent scoring component that is proportional to magnitudes of the term values of the query term for the first and second local entities, the magnitudes of the selection values of the query term for the first and second local entities, and the first and second selection ratios of queries terms for the first and second local entities; and
determining the similarity measures based, in part, on the constituent scoring components of the queries terms specified for the second local entity and the first local entity.

7. The method of claim 1, wherein determining, for each second local entity in the proper subset of local entities, the similarity measure that is a measure of similarity of the second local entity to the first local entity comprises:
determining, for each query term for the first local entity and for each query term of the second local entity, term quality score for the query term based on query selections for the queries that include the query term indicating one of a location bias or a navigational bias; and
determining the similarity measure that is a measure of similarity of the second local entity to the first local entity comprises determining the similarity measure base in part on the term quality scores of the query terms.

8. A system, comprising:
a data processing apparatus that includes one or more computers; and
a non-transitory data store storing instructions executable by the data processing apparatus and that upon such execution cause the data processing apparatus to perform operations comprising:
accessing data specifying, for each local entity in a set of local entities, wherein each local entity is a physical entity resolved to a geographic location and having local significance to the geographic location:
for each of a plurality of query terms, a term value that is proportional to a number of instances of queries that include the query term occurring in a query log;
for each of the plurality of query terms, a selection value that is a proportional to a number of selections of search results that each respectively reference the local entity in response to a query that includes the query term and attributed to the query term;
selecting a first local entity from the set of local entities;
selecting a first proper subset of second local entities from the set of local entities, the proper subset not including the first local entity; and
for each second local entity in the proper subset of local entities, determining a similarity measure that is a measure of similarity of the second local entity to the first local entity, the similarity measure being determined based, in part, on the term values and the selection values of the query terms specified for the second local entity and the first local entity; and
ranking the second local entities in the proper subset of local entities against each other in an order that is indicative of the respective similarities measures of the second local entities in the proper subset.

9. The system of claim 8, wherein selecting a proper subset of second local entities from the set of local entities comprises selecting only local entities that have a geographic location within a threshold distance of the geographic location of the first local entity to include in the proper subset.

10. The system of claim 8, wherein determining, for each second local entity in the proper subset of local entities, the similarity measure that is a measure of similarity of the second local entity to the first local entity comprises:
determining, for each query term:
a term frequency score that is proportional to the magnitude of the term value of the query term for the first local entity and the term value of the query term for the second local entity; and
a selection frequency score that is proportional to the magnitude of the selection value of the query term for the first local entity and the selection value of the query term for the second local entity;
determining the similarity measures based, in part, on the term frequency scores and the selection frequency scores of the queries terms specified for the second local entity and the first local entity.

11. The system of claim 8, wherein determining, for each second local entity in the proper subset of local entities, the similarity measure that is a measure of similarity of the second local entity to the first local entity comprises:
for each query term, determining a constituent scoring component that is proportional to magnitudes of the term values of the query term for the first and second local entities and the magnitudes of the selection values of the query term for the first and second local entities; and determining the similarity measures based, in part, on the constituent scoring components of the queries terms specified for the second local entity and the first local entity.

12. The system of claim 8, wherein determining, for each second local entity in the proper subset of local entities, the similarity measure that is a measure of similarity of the second local entity to the first local entity comprises:
   determining, for each query term for the first local entity, a first selection ratio that is proportional to the ratio of the selection value to the term value of the query term for the first local entity;
   determining, for each query term for the second local entity, a second selection ratio that is proportional to the ratio of the selection value to the term value of the query term for the second local entity; and
   determining the similarity measures based, in part, on the first and second selection ratios of queries terms specified for the second local entity and the first local entity.

13. The system of claim 12, wherein determining, for each second local entity in the proper subset of local entities, the similarity measure that is a measure of similarity of the second local entity to the first local entity further comprises:
   for each query term, determining a constituent scoring component that is proportional to magnitudes of the term values of the query term for the first and second local entities, the magnitudes of the selection values of the query term for the first and second local entities, and the first and second selection ratios of queries terms for the first and second local entities; and
   determining the similarity measures based, in part, on the constituent scoring components of the queries terms specified for the second local entity and the first local entity.

14. The system of claim 8, wherein determining, for each second local entity in the proper subset of local entities, the similarity measure that is a measure of similarity of the second local entity to the first local entity comprises:
   determining, for each query term for the first local entity and for each query term of the second local entity, term quality score for the query term based on query selections for the queries that include the query term indicating one of a location bias or a navigational bias; and
   determining the similarity measure that is a measure of similarity of the second local entity to the first local entity comprises determining the similarity measure base in part on the term quality scores of the query terms.

15. A non-transitory computer readable medium storing instructions executable by a data processing apparatus and that upon such execution cause the data processing apparatus to perform operations comprising:
   accessing data specifying, for each local entity in a set of local entities, wherein each local entity is a physical entity resolved to a geographic location and having local significance to the geographic location:
      for each of a plurality of query terms, a term value that is proportional to a number of instances of queries that include the query term occurring in a query log;
      for each of the plurality of query terms, a selection value that is a proportional to a number of selections of search results that each respectively reference the local entity in response to a query that includes the query term and attributed to the query term;
   selecting a first local entity from the set of local entities;
   selecting a first proper subset of second local entities from the set of local entities, the proper subset not including the first local entity; and
   for each second local entity in the proper subset of local entities, determining a similarity measure that is a measure of similarity of the second local entity to the first local entity, the similarity measure being determined based, in part, on the term values and the selection values of the query terms specified for the second local entity and the first local entity; and
   ranking the second local entities in the proper subset of local entities against each other in an order that is indicative of the respective similarities measures of the second local entities in the proper subset.

16. The non-transitory computer readable medium of claim 15, wherein selecting a proper subset of second local entities from the set of local entities comprises selecting only local entities that have a geographic location within a threshold distance of the geographic location of the first local entity to include in the proper subset.

17. The non-transitory computer readable medium of claim 15, wherein determining, for each second local entity in the proper subset of local entities, the similarity measure that is a measure of similarity of the second local entity to the first local entity comprises:
   determining, for each query term:
      a term frequency score that is proportional to the magnitude of the term value of the query term for the first local entity and the term value of the query term for the second local entity; and
      a selection frequency score that is proportional to the magnitude of the selection value of the query term for the first local entity and the selection value of the query term for the second local entity;
   determining the similarity measures based, in part, on the term frequency scores and the selection frequency scores of the queries terms specified for the second local entity and the first local entity.

18. The non-transitory computer readable medium of claim 15, wherein determining, for each second local entity in the proper subset of local entities, the similarity measure that is a measure of similarity of the second local entity to the first local entity comprises:
   for each query term, determining a constituent scoring component that is proportional to magnitudes of the term values of the query term for the first and second local entities and the magnitudes of the selection values of the query term for the first and second local entities; and
   determining the similarity measures based, in part, on the constituent scoring components of the queries terms specified for the second local entity and the first local entity.

19. The non-transitory computer readable medium of claim 15, wherein determining, for each second local entity in the proper subset of local entities, the similarity measure that is a measure of similarity of the second local entity to the first local entity comprises:
   determining, for each query term for the first local entity, a first selection ratio that is proportional to the ratio of the selection value to the term value of the query term for the first local entity;
   determining, for each query term for the second local entity, a second selection ratio that is proportional to the ratio of the selection value to the term value of the query term for the second local entity; and determining the similarity measures based, in part, on the first and second selection ratios of queries terms specified for the second local entity and the first local entity.

20. The non-transitory computer readable medium of claim 15, wherein determining, for each second local entity in the proper subset of local entities, the similarity measure that is a measure of similarity of the second local entity to the first local entity further comprises:

for each query term, determining a constituent scoring component that is proportional to magnitudes of the term values of the query term for the first and second local entities, the magnitudes of the selection values of the query term for the first and second local entities, and the first and second selection ratios of queries terms for the first and second local entities; and determining the similarity measures based, in part, on the constituent scoring components of the queries terms specified for the second local entity and the first local entity.

* * * * *